(12) United States Patent
Tang et al.

(10) Patent No.: US 10,868,464 B2
(45) Date of Patent: Dec. 15, 2020

(54) LINEAR VIBRATION MOTOR

(71) Applicant: AAC Acoustic Technologies (Shenzhen) Co., Ltd., Shenzhen (CN)

(72) Inventors: Yun Tang, Shenzhen (CN); Lubin Mao, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 7 days.

(21) Appl. No.: 16/524,211

(22) Filed: Jul. 29, 2019

(65) Prior Publication Data
US 2020/0044543 A1 Feb. 6, 2020

(30) Foreign Application Priority Data

Aug. 3, 2018 (CN) .................... 2018 2 1255704 U

(51) Int. Cl.
*H02K 33/18* (2006.01)
(52) U.S. Cl.
CPC .................................. *H02K 33/18* (2013.01)
(58) Field of Classification Search
CPC ............................... H02K 33/18; H02K 33/16
See application file for complete search history.

(56) References Cited

U.S. PATENT DOCUMENTS

2003/0227225 A1* 12/2003 Kaneda ............... B06B 1/045
310/81
2010/0102646 A1* 4/2010 Masami ............... H02K 33/16
310/29
2011/0193426 A1* 8/2011 Chung ............... H02K 33/16
310/25

FOREIGN PATENT DOCUMENTS

WO  WO-2018058807 A1 * 4/2018 ............. H02K 33/02

* cited by examiner

*Primary Examiner* — Naishadh N Desai
(74) *Attorney, Agent, or Firm* — W&G Law Group LLP

(57) ABSTRACT

Disclosed is a linear vibration motor, including an housing, a driving unit, a vibration unit, and an elastic component. The vibration unit includes a mass block having a through hole, and a permanent magnet and a pole core that are disposed in the through hole, the driving unit includes an iron core fixed on the housing and running through the through hole and a coil wound around the iron core, the pole core is disposed at one side of the permanent magnet close to the coil, the iron core includes an iron core body portion running through the through hole and two iron core abutting portions, the coil is wound around the iron core body portion, two different sides of the permanent magnet have different magnetic polarities, and after the coil is powered on, the two iron core abutting portions have opposite magnetic polarities.

10 Claims, 4 Drawing Sheets

A-A

LINEAR VIBRATION MOTOR

TECHNICAL FIELD

The present disclosure relates to the field of vibration motors, and in particular, to a linear vibration motor.

BACKGROUND

A linear vibration motor is a component that converts electric energy to mechanical energy based on a generation principle of an electromagnetic force. The linear vibration motor is generally mounted in a portable mobile device, to generate vibration feedback, for example, vibration of a mobile phone or a vibration feedback of a game console.

In the prior art, a linear vibration motor includes a housing having an accommodation space, a vibration unit accommodated in the accommodation space, an elastic member suspending the vibration unit in the accommodation space, and a driving unit driving the vibration unit to vibrate. The vibration unit includes a permanent magnet, the driving unit includes a coil, and the linear vibration motor generally provides a driving force by using only a Lorentz force generated through interaction between the coil and a magnetic field of the permanent magnet, to drive the vibration component to vibrate reciprocally. However, the driving force of the linear vibration motor is relatively small, causing a relatively long response time for vibration.

Therefore, it is necessary to provide a new linear vibration motor to resolve the foregoing problem.

BRIEF DESCRIPTION OF THE DRAWINGS

To more clearly describe the technical solutions in the embodiments of the present disclosure, the following briefly describes the accompanying drawings required for describing the embodiments. Apparently, the accompanying drawings in the following description merely show some embodiments of the present disclosure, and a person of ordinary skill in the art can derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person skilled in the art based on the embodiments of the present disclosure without creative efforts shall fall within the protection scope of the present disclosure.

Embodiment 1

Figure 1:
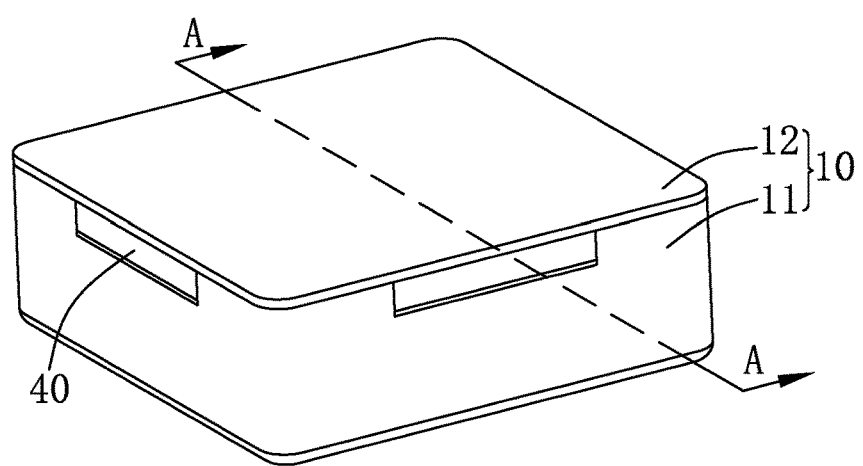
FIG. 1 is a three-dimensional schematic structural diagram of a linear vibration motor according to the present disclosure.
Figure 2:
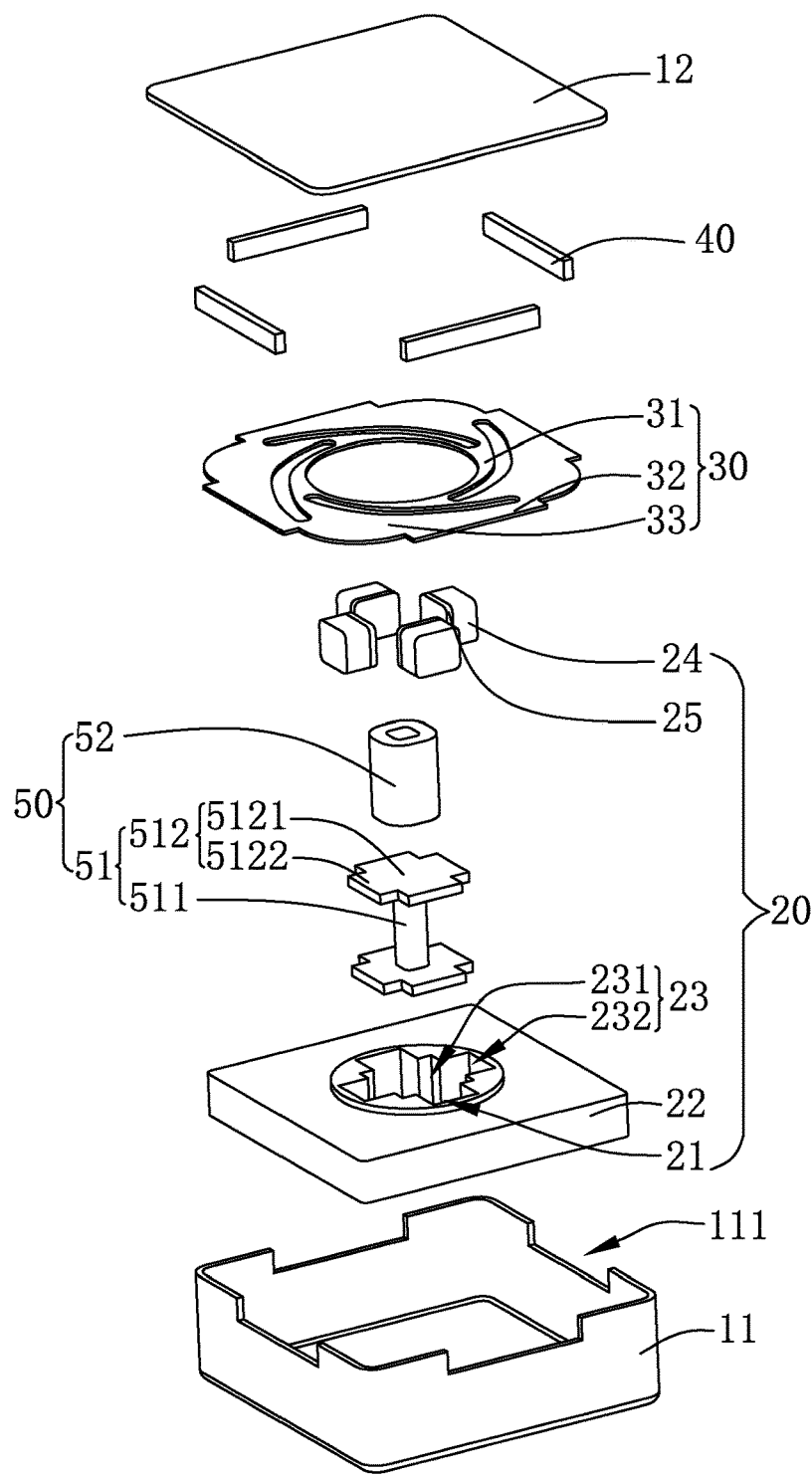
FIG. 2 is an exploded schematic structural diagram of the linear vibration motor according to the present disclosure.
Figure 3:
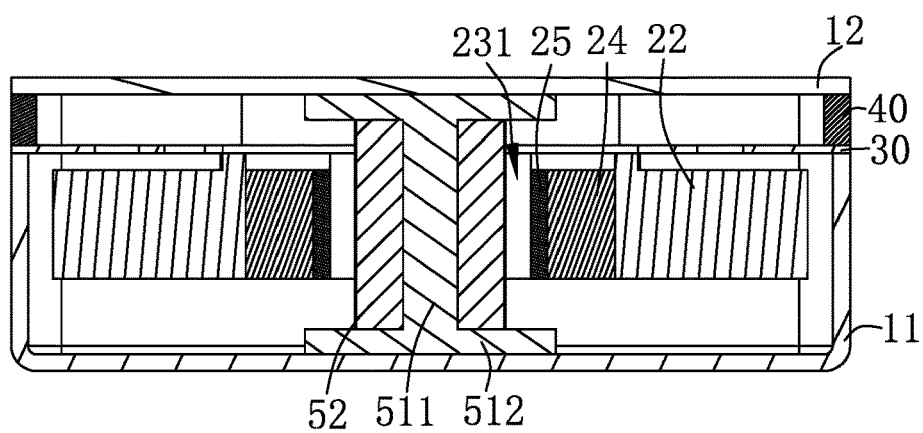
FIG. 3 is a schematic diagram of a section taken along a line A-A in FIG. 1.

With reference to FIG. 1 to FIG. 3, the present disclosure provides a linear vibration motor 100, including a housing 10 having an accommodation space, a vibration unit 20 accommodated in the accommodation space, an elastic component 30 suspending the vibration unit 20 in the accommodation space, a baffle plate 40 disposed on the housing 10, and a driving unit 50 driving the vibration unit 20 to vibrate.

The housing 10 includes a first housing 11 having a side wall and a second housing 12 covering the first housing 11 and defining the accommodation space.

The vibration unit 20 includes a mass block 22 having a through hole 21, a permanent magnet holder 23 mounted in the through hole 21, a permanent magnet 24 embedded in the permanent magnet holder 23, and a pole core 25 fixed on the permanent magnet 24.

The mass block 22 is made of a non-magnetic conductive material.

The permanent magnet holder 23 includes a rectangular through hole 231 located at the center of the permanent magnet holder 23 and a mounting groove 232 recessed in a direction away from an axis of the through hole 231 from an inner wall of the through hole 231, and the permanent magnet 24 is embedded in the mounting groove 232.

The axis of the through hole 231 and the axis of the through hole 21 are in a same straight line.

Four mounting grooves 232 are provided, and the four mounting grooves 232 are distributed in an array on four inner walls of the through hole 231.

Four permanent magnets 24 are provided, and the four permanent magnets 24 are spaced from each other and respectively embedded into the four mounting grooves 232.

Preferably, the permanent magnet 24 is a magnet steel or a magnetic ring.

Four pole cores 25 are provided, and the four pole cores 25 are respectively disposed on the four permanent magnets 24, so that magnetism of the four permanent magnets 24 is more easily gathered.

One end of the elastic component 30 is fixed on the mass block 22 and the other end of the elastic component 30 is fixed on the baffle plate 40.

The elastic component 30 includes a fixed portion 31 fixedly connected to the mass block 22, a connecting portion 32 fixedly connected to the baffle plate 40, and a deformation portion 33 connecting the fixed portion 31 and the connecting portion 32.

The baffle plate 40 is disposed on a side wall of the first housing 11, the baffle plate 40 is connected to the elastic component 30 to fix the elastic component 30 on the first housing 11.

Specifically, a groove 111 accommodating the baffle plate 40 is provided at the side wall of the first housing 11, and the connecting portion 32 of the elastic component 30 is sandwiched between the baffle plate 40 and a groove bottom of the groove 111.

Four baffle plates 40 are provided, and correspondingly, four grooves 111 are also provided, and the four baffle plates 40 are respectively distributed in an array on the four grooves 111.

The driving unit 50 includes an iron core 51 fixedly mounted on the housing 10 and running through the through hole 231, and a coil 52 wound around the iron core 51.

The four pole cores 25 are respectively disposed at one side of the four permanent magnets 24 close to the coil 52.

The iron core 51 includes an iron core body portion 511 running through the through hole 231 and an iron core abutting portion 512 extending in a direction of an axis of the iron core body portion 511 and away from the iron core body portion 511.

Two iron core abutting portions 512 are provided, the two iron core abutting portions 512 are located at two ends of the iron core body portion 511 and spaced from the mass block 22, and the two iron core abutting portions 512 respectively abut against the first housing 11 and the second housing 12.

The iron core abutting portion 512 includes a cuboidal main body portion 5121 connected to the iron core body portion 511 and an extension portion 5122 extending from a side of the main body portion 5121 in a direction away from the center of the main body portion 5121.

The axis of the iron core body portion 511 and the axis of the main body portion 5121 are in a same straight line.

Four extension portions 5122 are provided, and the four extension portions 5122 are distributed in an array on the four sides of the main body portion 5121 respectively.

An orthographic projection of the extension portion 5122 on the permanent magnet 24 at least partially falls on the permanent magnet 24.

The coil 52 is wound around the iron core body portion 511.

Figure 4:
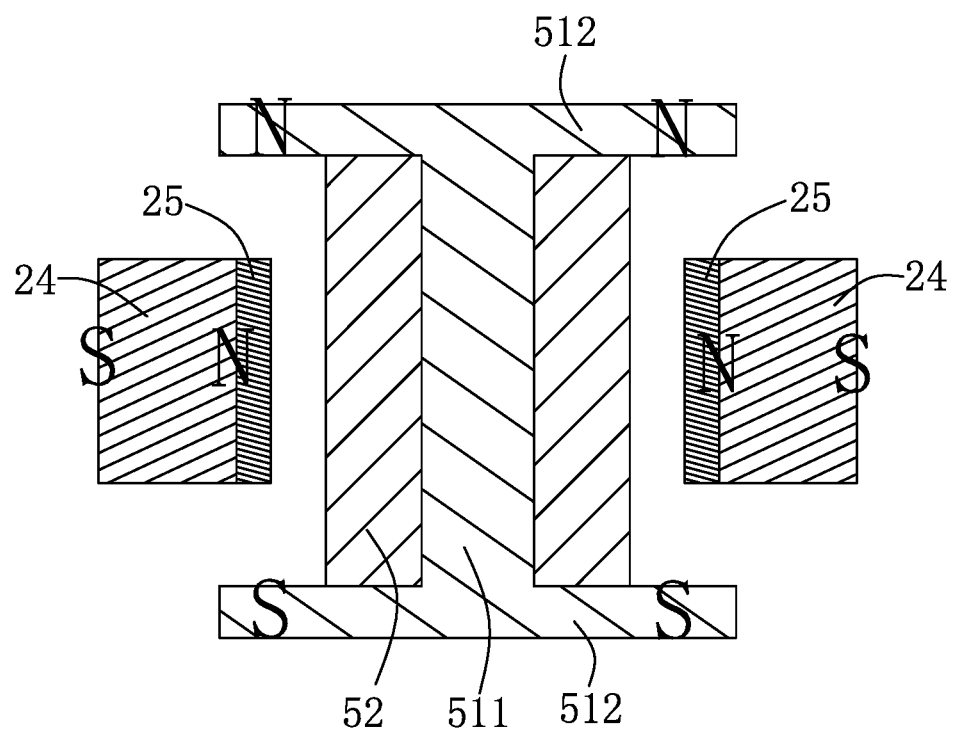
FIG. 4 is a schematic structural diagram of magnetic polarities of an iron core and a permanent magnet after a linear vibration motor is powered on according to the present disclosure.

With reference to FIG. 4, a magnetic polarity of one side of the permanent magnet 24 close to the coil 52 is opposite to a magnetic polarity of one side of the permanent magnet 24 close to the mass block 22.

In this embodiment, N poles of the four permanent magnets 24 are disposed opposite each other. When the coil 52 is powered on, a magnetic line of the permanent magnet 24 interacts with the coil 52 to generate a Lorentz force to drive the mass block 22 to vibrate. Specifically, the iron core 51 is magnetized when the coil 52 is powered on. For ease of description, when the coil 52 is powered on, the iron core abutting portion 512 on one side of the iron core 51 close to the first housing 11 is set as the N pole, the iron core abutting portion 512 on one side of the iron core 51 close to the second housing 12 is set as an S pole. In this case, the N pole of the iron core abutting portion 512 generates an attraction force with the permanent magnet 24, the S pole of the iron core abutting portion 512 generates a repulsion force with the permanent magnet 24, a resultant force of the action forces between the iron core 51 and the permanent magnet 24 is oriented to one side away from the second housing 12, to push the mass block 22 to vibrate in a direction away from the second housing 12.

Correspondingly, when the coil 52 is reversely powered on, a resultant force of the acting forces between the iron core 51 and the permanent magnet 24 moves toward one side close to the second housing 12, so as to push the mass block 22 to vibrate in a direction close to the second housing 12. S poles of the four permanent magnets 24 may also be disposed opposite to each other, and a principle of forming a magnetic loop is the same as that of generating the action force by the iron core 51 as described above.

By disposing the iron core 51 and the coil 52, the linear vibration motor 100 can generate two driving forces driving the mass block 22 to vibrate, that is, the Lorentz force generated by the permanent magnet 24 and the coil 52 after the coil 52 is electrified, and an electromagnetic force generated through interaction between the iron core 51 which is magnetized after the coil 52 is electrified and the permanent magnet 24. The Lorentz force and the electromagnetic force are superposed, to achieve a greater driving force, and higher response speed of the linear vibration motor 100.

Compared with the related art, in the linear vibration motor provided in the present disclosure, the iron core is disposed, so that the coil is wound around the iron core body portion of the iron core; and moreover, the iron core is provided with the iron core abutting portion, and the iron core abutting portion is disposed opposite the permanent magnet, so that when the coil is electrified, the coil interacts with a magnetic field of the permanent magnet to generate a Lorentz force to drive the vibration unit vibrate, and the iron core abutting portion is magnetized and also generates an acting force on the permanent magnet. The Lorentz force generated between the permanent magnet and the electrified coil is superposed with the acting force between the iron core abutting portion that is magnetized after the coil is electrified and the permanent magnet, so that the driving force that drives the vibration unit to vibrate is increased. The one side of the permanent magnet close to the coil is provided with the pole core, so that magnetism of the permanent magnet is more easily gathered, thereby providing a higher response speed of the linear vibration motor.

Only implementations of the present disclosure are described above, and it should be noted herein that, for a person of ordinary skill in the art, improvements can also be made without departing from the creative concept of the present disclosure, and these improvements shall fall within the protection scope of the present disclosure.

What is claimed is:

1. A linear vibration motor, comprising a housing having an accommodation space, a vibration unit accommodated in the accommodation space, an elastic member suspending the vibration unit in the accommodation space, and a driving unit driving the vibration unit to vibrate;
    wherein the vibration unit comprises a mass block having a through hole, a permanent magnet mounted in the through hole, and a pole core fixed on the permanent magnet;
    wherein the driving unit comprises an iron core fixedly mounted on the housing and running through the through hole, and a coil wound around the iron core; the pole core is disposed at one side of the permanent magnet close to the coil; the iron core comprises an iron core body portion running through the through hole and two iron core abutting portions extending away from an axis of the iron core body portion from two ends of the iron core body portion; the coil is wound around the iron core body portion, a magnetic polarity of one side of the permanent magnet close to the coil is opposite to a magnetic polarity of one side of the permanent magnet close to the mass block; and after the coil is electrified, the two iron core abutting portions have opposite magnetic polarities.

2. The linear vibration motor according to claim 1, wherein the vibration unit further comprises a permanent magnet holder mounted in the through hole, the permanent magnet holder comprises a rectangular through hole located at the center of the permanent magnet holder and a mounting groove recessed in a direction away from an axis of the through hole from an inner wall of the through hole, and the permanent magnet is embedded in the mounting groove.

3. The linear vibration motor according to claim 2, wherein four mounting grooves are provided, and the four mounting grooves are distributed in an array on four inner walls of the through hole respectively; four permanent magnets are disposed, and the four permanent magnets are spaced from each other and respectively embedded into the four mounting grooves.

4. The linear vibration motor according to claim 3, wherein four pole cores are disposed, and the four pole cores are respectively disposed at one side of the four permanent magnets close to the coil.

5. The linear vibration motor according to claim 1, wherein the iron core abutting portion comprises a main body portion connected to the iron core body portion and an extension portion extending in a direction away from a central direction of the main body portion from a side of the main body portion, and an orthographic projection of the extension portion on the permanent magnet at least partially falls on the permanent magnet.

6. The linear vibration motor according to claim 1, wherein the linear vibration motor further comprises a baffle plate connected to the housing and used to fix the elastic component.

7. The linear vibration motor according to claim 6, wherein the elastic component comprises a fixed portion fixedly connected to the mass block, a connecting portion fixedly connected to the baffle plate, and a deformation portion connecting the fixed portion and the connecting portion.

8. The linear vibration motor according to claim 7, wherein the housing comprises a first housing having a side wall and a second housing covering the first housing; a groove accommodating the baffle plate is provided at the side wall of the first housing; the connecting portion of the elastic component is sandwiched between the baffle plate and a groove bottom of the groove; and four baffle plates are provided, correspondingly, four grooves are also provided, and the four baffle plates are distributed in an array on the grooves of the side wall respectively.

9. The linear vibration motor according to claim 1, wherein the permanent magnet is a magnetic ring.

10. The linear vibration motor according to claim 1, wherein the mass block is made of a non-magnetic conductive material.

* * * * *